US011937059B2

(12) United States Patent
Wang

(10) Patent No.: US 11,937,059 B2
(45) Date of Patent: Mar. 19, 2024

(54) COMPOSITE HEADPHONE

(71) Applicant: GOERTEK INC., Shandong (CN)

(72) Inventor: Haiyong Wang, Shandong (CN)

(73) Assignee: GOERTEK INC., Shandong (CN)

( * ) Notice: Subject to any disclaimer, the term of this patent is extended or adjusted under 35 U.S.C. 154(b) by 261 days.

(21) Appl. No.: 17/608,310

(22) PCT Filed: Dec. 31, 2019

(86) PCT No.: PCT/CN2019/130290
§ 371 (c)(1),
(2) Date: Nov. 2, 2021

(87) PCT Pub. No.: WO2021/103265
PCT Pub. Date: Jun. 3, 2021

(65) Prior Publication Data

US 2022/0256288 A1 Aug. 11, 2022

(30) Foreign Application Priority Data

Nov. 28, 2019 (CN) ......................... 201911191620.7

(51) Int. Cl.
*H04R 5/033* (2006.01)
*H04B 5/00* (2006.01)
(Continued)

(52) U.S. Cl.
CPC ........... *H04R 5/033* (2013.01); *H04R 1/1025* (2013.01); *H04R 1/1041* (2013.01); *H04R 2420/07* (2013.01)

(58) Field of Classification Search
None
See application file for complete search history.

(56) References Cited

U.S. PATENT DOCUMENTS

2016/0241947 A1* 8/2016 Degraye .............. H04R 1/1083
2018/0109864 A1 4/2018 Yamamoto
2021/0045191 A1 2/2021 Hsieh

FOREIGN PATENT DOCUMENTS

CN 104581479 4/2015
CN 206117948 4/2017
(Continued)

OTHER PUBLICATIONS

Li et al., CN104581479A "Demountable wireless earphone system". English translation provided by EPO. pp. 1-8. (Year: 2014).*
(Continued)

*Primary Examiner* — Qin Zhu
(74) *Attorney, Agent, or Firm* — HAUPTMAN HAM, LLP

(57) ABSTRACT

A composite headphone is provided. The composite headphone includes a wireless Bluetooth headphone and a wired headset. The wireless Bluetooth headphone is detachably arranged on the wired headset. When the wireless Bluetooth headphone separates from the wired headset, the wireless Bluetooth headphone operates independently and the wired headset operates independently. When the wireless Bluetooth headphone is arranged on the wired headset and a composite event is triggered, the wireless Bluetooth headphone cooperates with the wired headset, so that the wired headset operates as a wireless Bluetooth headphone. When the wireless Bluetooth headphone is arranged on the wired headset and no composite event is triggered, the wired headset charges the wireless Bluetooth headphone.

16 Claims, 3 Drawing Sheets

(51) Int. Cl.

| | |
|---|---|
| ***H04R 1/10*** | (2006.01) |
| ***H04R 3/00*** | (2006.01) |
| ***H04R 5/04*** | (2006.01) |

(56) References Cited

FOREIGN PATENT DOCUMENTS

| | | |
|---|---|---|
| CN | 109314813 | 2/2019 |
| CN | 109862460 | 6/2019 |
| WO | WO2018098136 | 11/2017 |

OTHER PUBLICATIONS

International Search Report issued in PCT/CN2019/130290 dated Aug. 28, 2020.

* cited by examiner

COMPOSITE HEADPHONE

The present application is a 371 application of International Patent Application No. PCT/CN2019/130290, titled "COMPOSITE HEADPHONE", filed on Dec. 31, 2019 which claims the benefit and priority to Chinese Patent Application No. 201911191620.7, titled "COMPOSITE HEADPHONE", filed on Nov. 28, 2019 with the China National Intellectual Property Administration, which are incorporated herein by reference in their entireties.

FIELD

The present disclosure relates to the technical field of headphones, and in particular to a composite headphone.

BACKGROUND

With the development of headphone technology and the improvement of user requirements, headphones are divided into various types, such as a true wireless stereo (TWS) headphone, a gaming headphone, a wired headphone and a sport headphone. Users commonly choose headphones depending on requirements in various scenarios. For example, the TWS headphone is commonly used outdoor for portability. The gaming headphone or the wired headphone is commonly used for playing games to ensure low delay and high comfort. Headphones with sound effect processing are used when high-quality sound effect is pursued. None of the various types of headphones according to the conventional technology have all the advantages described above, and cannot meet user requirements for using effects in various scenarios.

SUMMARY

A composite headphone is provided according to the present disclosure. The composite headphone has advantages of portability, high-quality sound effect and low delay, to meet the user requirements for using effects in different scenarios, and improve the user experience and reduce the cost.

To solve the above technical problem, a composite headphone is provided according to the present disclosure. The composite headphone includes a wired headset and a wireless Bluetooth® headphone. The wired headset is configured to: establish, when the wireless Bluetooth® headphone is arranged on the wired headset and a composite event is triggered, an audio transmission connection with the wireless Bluetooth® headphone; and play, when the wireless Bluetooth® headphone is arranged on the wired headset and a composite event is triggered, first audio. The first audio is received by the wireless Bluetooth® headphone via Bluetooth®. The wireless Bluetooth® headphone is configured to: detachably arranged on the wired headset; and transmit, via Bluetooth®, voice acquired by the wired headset.

Preferably, the wireless Bluetooth® headphone is a TWS headphone.

Preferably, the wired headset includes a voice decoding chip, an audio playing device, a voice acquisition device and an audio interface. The audio playing device, the voice acquisition device and the audio interface are connected to the voice decoding chip. The wireless Bluetooth® headphone includes a Bluetooth® voice decoding chip. The voice decoding chip is configured to: control, when the wireless Bluetooth® headphone is arranged on the wired headset and a composite event is triggered, the Bluetooth® voice decoding chip to establish an audio transmission connection with an audio playing device of a corresponding earpiece and the voice acquisition device or establish an audio transmission connection with an audio playing device of a corresponding earpiece; and perform, when the wired headset operate independently, stereo sound effect processing on second audio transmitted via the audio interface. The Bluetooth® voice decoding chip is configured to: convert voice acquired by the voice acquisition device connected to the Bluetooth® voice decoding chip from analog to digital, and transmit the converted voice via Bluetooth®; and convert the first audio received via Bluetooth® from digital to analog, and play the converted first audio via the audio playing device of the corresponding earpiece.

Preferably, the Bluetooth® voice decoding chip is further configured to disconnect, when a composite event is triggered, from an audio playing device and a voice acquisition device of the wireless Bluetooth® headphone. The voice decoding chip is further configured to disconnect, when the composite event is triggered, from the voice acquisition device and the audio interface.

Preferably, for disconnecting from the audio playing device and the voice acquisition device of the wireless Bluetooth® headphone, the Bluetooth® voice decoding chip is configured to: after converting the first audio received via Bluetooth® from digital to analog, not play the converted first audio via the audio playing device of the wireless Bluetooth® headphone; perform no processing on voice acquired by the voice acquisition device of the wireless Bluetooth® headphone.

Preferably, the wired headset further includes a button connected to the voice decoding chip. The composite event is triggered when a composite command transmitted by the button is received.

Preferably, the wired headset further includes a detection device connected to the voice decoding chip. The voice decoding chip is further configured to establish, before controlling the Bluetooth® voice decoding chip to establish an audio transmission connection with the audio playing device of the corresponding earpiece and the voice acquisition device, a signal communication connection with the Bluetooth® voice decoding chip when the detection device detects that the wireless Bluetooth® headphone is arranged on the wired headset.

Preferably, the wired headset is provided with a magnet. The wireless Bluetooth® headphone is provided with an iron sheet matched with the magnet. Alternatively, the wireless Bluetooth® headphone is provided with a magnetic attraction member magnetically opposite to the magnet.

Preferably, the audio interface includes at least one of a digital audio interface an analog audio interface.

Preferably, the wired headset further includes a battery, and a power management chip connected with the battery. The voice decoding chip is further configured to control, when the wireless Bluetooth® headphone is arranged on the wired headset, the battery to charge the wireless Bluetooth® headphone via the power management chip.

Preferably, the voice decoding chip is further configured to acquire, before controlling the battery to charge the wireless Bluetooth® headphone via the power management chip, power of the wireless Bluetooth® headphone. The voice decoding chip is configured to control, when determining that the power of the wireless Bluetooth® headphone is less than a first threshold and power of the battery is greater than a second threshold, the battery to charge the wireless Bluetooth® headphone via the power management chip.

A composite headphone is provided according to the present disclosure. The composite headphone includes a wireless Bluetooth® headphone and a wired headset. The wireless Bluetooth® headphone is detachably arranged on the wired headset. When the wireless Bluetooth® headphone separates from the wired headset, the wireless Bluetooth® headphone operates independently and the wired headset operates independently. In this case, the wireless Bluetooth® headphone meets the requirements of portability, and the wired headset meets requirements for high-quality sound effect and low-delay. When the wireless Bluetooth® headphone is arranged on the wired headset, the wireless Bluetooth® headphone cooperates with the wired headset, so that the wired headset operates as a wireless Bluetooth® headphone, thereby meeting the requirements of both portability and high-quality sound effect, and further improving comfort of using in a state of wireless audio transmission. It can be seen that the composite headphone has advantages of portability, high-quality sound effect and low delay, thereby meeting the user requirements for using effects in various scenarios, and improving the user experience and reducing the cost.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

A composite headphone is provided according to the present disclosure. The composite headset has advantages of portability, high-quality sound effect and low delay, thereby meeting the user requirements for using effects in various scenarios, and improving the user experience and reducing the cost.

In order to make objects, technical solutions and advantages of embodiments of the present disclosure clearer, the technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

In the conventional technology, various headphones are provided to meet the user requirements for using effects in various scenarios respectively, resulting in problems of non-portability, general sound effect and high cost. In the present disclosure, a wired headset is combined with a wireless Bluetooth® headphone to solve the above problems. The wireless Bluetooth® headphone is implemented by a single wireless Bluetooth® earbud, or a TWS headphone that is currently most popular. The description is given below in details with the wireless Bluetooth® headphone being implemented by the TWS headphone.

Figure 1:
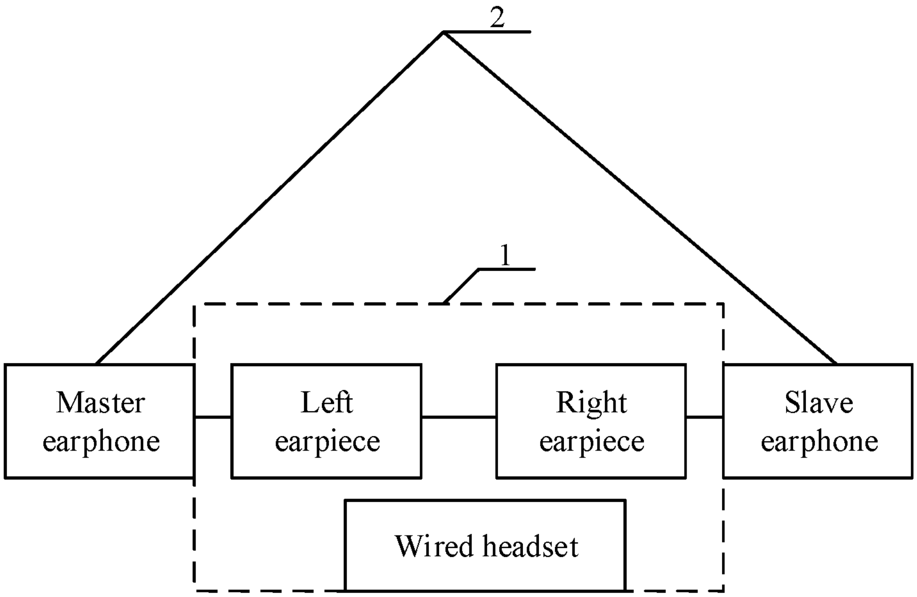
FIG. 1 is a schematic structural diagram showing a composite headphone according to an embodiment of the present disclosure.

Reference is made to FIG. 1, which is a schematic structural diagram of a composite headphone according to the present disclosure. In FIG. 1, for example, a left earbud of the TWS headphone serves as a master earbud and a right earbud of the TWS headphone serves as a slave earbud.

The composite headphone includes a wired headset 1 and a TWS headphone 2. The wired headset 1 is configured to: establish an audio transmission connection with the TWS headphone 2 when the TWS headphones 2 is arranged on the wired headset 1 and a composite event is triggered; and play first audio when the TWS headphones 2 is arranged on the wired headset 1 and a composite event is triggered. The first audio is received by the TWS headphone 2 via Bluetooth®. The TWS headphone 2 is detachably arranged on the wired headset 1, and is configured to transmit voice via Bluetooth® The voice is acquired by the wired headset 1.

The composite headphone is provided according to an embodiment. The composite headphone includes the wired headset 1 and the TWS headphone 2. The TWS headphone 2 is detachably arranged on the wired headset 1 (at any position except an acoustic cavity). Specifically, the left earbud of the TWS headphone 2 is detachably arranged on a left earpiece of the wired headset 1, and a right earbud of the TWS headphone 2 is detachably arranged on a right earpiece of the wired headset 1. In practice, the user determines whether to arrange the TWS headphone 2 on the wired headset 1 depending on specific application scenarios. The TWS headphone 2 and the wired headset 1 operate in the following cases.

1) THE TWS headphone 2 separates from the wired headset 1

In this case, the TWS headphone 2 operates independently. When receiving audio via Bluetooth® of the TWS headphone 2, the TWS headphone 2 converts the audio from digital to analog, and then plays converted the audio. When receiving voice, the TWS headphone 2 converts the voice from analog to digital and then transmits the converted voice via Bluetooth® of the TWS headphone 2.

In this case, the wired headset 1 operates independently. The wired headset 1 receives audio via a headset cable. In a case that the audio is analog, the wired headset 1 directly plays the audio. In a case that the audio is digital, the wired headset 1 converts the audio from digital to analog, and then plays converted the audio. When acquiring voice, the wired headset 1 converts the voice from analog to digital and then transmits the voice via a digital audio interface, or directly transmits the voice via an analog audio interface in a case that the acquired voice is analog.

It can be seen that in this case, the TWS headphone 2 and the wired headset 1 independent of each other. The TWS headphone 2 serve as a wireless headphone based on Bluetooth®, to meet the user requirements for portability. An acoustic cavity and a sound playing device (such as a speaker) of the wired headset 1 are commonly large, and therefore the user requirements for high-quality sound effect can be met. In addition, the wired headset 1 transmits audio and voice via the headset cable, which can further meet user requirements for low-delay.

2) The TWS headphone 2 is arranged on the wired headset 1 and a composite event is triggered.

It should be noted that triggering the composite event refers to an operation of triggering the wired headset 1 when the TWS headphone 2 is required to cooperates with the wired headset 1. When the TWS headphone 2 cooperates with the wired headset 1, the TWS headphone 2 serves as a Bluetooth® communication module, that is, a transfer node for the wired headset 1 to communicate with outside.

It can be understood that when the TWS headphone 2 is arranged on the wired headset 1 and the composite event is triggered, an audio transmission connection is established between the wired headset 1 and the TWS headphone 2, thereby transmitting audio and voice between the wired headset 1 and the TWS headphone 2. The audio transmission connection herein indicates that the TWS headphone 2 is connected to an audio playing device 13 and a voice acquisition device 12 in the wired headset 1. When receiving first audio via Bluetooth® of the TWS headphone 2, the TWS headphone 2 transmit the first audio to the wired headset 1. When receiving the first audio, the wired headset 1 plays the first audio. When acquiring voice, the wired headset 1 transmits the voice to the TWS headphone 2, and then the TWS headphone 2 transmits the voice via Bluetooth®. In addition, voice is transmitted via only one earbud in practice. Therefore, only the master earbud of the TWS headphone 2 is configured to transmit the voice.

It can be seen that when the TWS headphone 2 is arranged on the wired headset 1 and the composite event is triggered, the wired headset 1 serves as a wireless Bluetooth® headphone. In addition, the acoustic cavity and the sound playing device of the wired headset 1 are commonly large. Therefore, the wired headset 1 meets the user requirements for both low delay and high-quality sound effect.

3) The TWS headphone 2 is arranged on the wired headset 1 and no composite event is not triggered.

In this case, no audio transmission connection is established between the TWS headphone 2 and the wired headset 1. The wired headset 1 operates independently. The wired headset 1 receives audio via the headset cable. In a case that the audio is analog, the wired headset 1 converts the audio from the analog to digital, and then plays the converted audio, and/or in a case that the audio is digital, the wired headset 1 directly plays the audio. When acquiring voice, the wired headset 1 converts the voice from analog to digital, and then transmits the converted voice via the headset cable, which can meet the user requirements for both low delay and high-quality sound effect.

In practice, although no audio transmission connection is established between the TWS headphone 2 and the wired headset 1, a charging connection is established between the TWS headphone 2 and the wired headset 1. That is, the wired headset may charge the TWS headphone 2. It can be seen that the wired headset 1 may charge the TWS headphone 2 while meeting the user requirements for both low delay and high-quality sound effect.

In summary, with the composite headphone according to the present disclosure, the TWS headphone 2 and the wired headset 1 operate independently when the TWS headphone 2 is separate from the wired headset 1. The TWS headphone 2 meets the requirements for portability, and the wired headset 1 meets the requirements for high-quality sound effect and low-delay. When the TWS headphone 2 is arranged on the wired headset 1, the TWS headphone 2 cooperates with the wired headset 1, so that the wired headset 1 serves as a wireless Bluetooth® headphone, thereby meeting the requirements of portability and high-quality sound effect, and further improving comfort of using in a state of wireless audio transmission. It can be seen that the composite headphone has the advantages of portability, high-quality sound effect and low delay, thereby meeting the user requirements for using effects in various scenarios, improving the user experience and reducing the cost.

Figure 2:
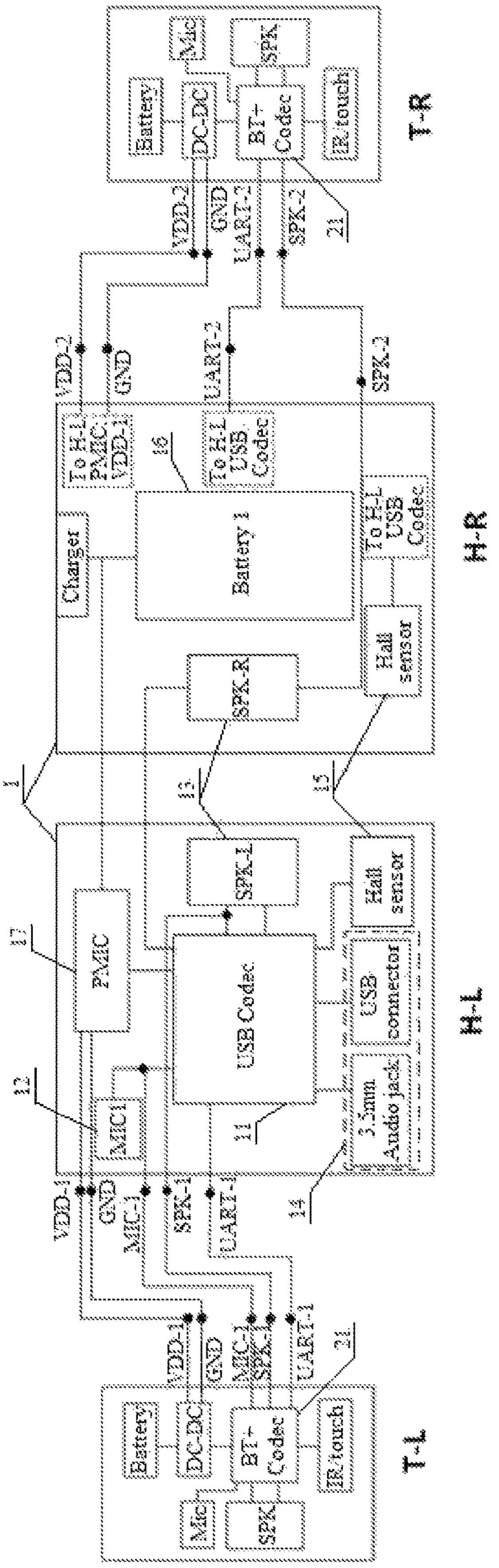
FIG. 2 is a schematic structural diagram showing a composite headphone in detail according to an embodiment of the present disclosure.

Reference is made to FIG. 2, which is a schematic structural diagram showing a composite headphone in detail according to the present disclosure.

Based on the above embodiment, in a preferred embodiment, the wired headset 1 includes a voice decoding chip 11, an audio playing device 13, a voice acquisition device 12 and an audio interface 14. The audio playing device 13, the voice acquisition device 12 and the audio interface 14 are connected to the voice decoding chip 11. The TWS headphone 2 includes a Bluetooth® voice decoding chip 21.

The voice decoding chip 11 is configured to: control, when the TWS headphone 2 is arranged on the wired headset 1 and a composite event is triggered, the Bluetooth® voice decoding chip 21 to establish an audio transmission connection with both the audio playing device 13 of a corresponding earpiece and the voice acquisition device 12, or an audio transmission connection with the audio playing device 13 of a corresponding earpiece; and perform stereo sound effect processing on second audio transmitted from the audio interface 14 when the wired headset 1 operate independently.

The Bluetooth® voice decoding chip 21 is configured to convert voice acquired by the voice acquisition device 12 connected to the Bluetooth® voice decoding chip 21 from analog to digital, and transmit the converted voice via Bluetooth®; and convert first audio received via Bluetooth® from digital to analog, and play converted the first audio via an audio playing device 13 of the corresponding earpiece.

It can be understood that the wired headset 1 commonly includes only one voice decoding chip 11 (corresponding to USB codec in FIG. 2) and one voice acquisition device 12 (corresponding to MIC1 in FIG. 2). A left earpiece (corresponding to H-L in FIG. 2) and a right earpiece (corresponding to H-R in FIG. 2) each include the audio playing device 13. A left earbud (corresponding to T-L in FIG. 2) of the TWS headphone 2 and a right earbud (corresponding to T-R in FIG. 2) of the TWS headphone 2 each include the Bluetooth® voice decoding chip 21 (corresponding to BT+Codec in FIG. 2).

When the TWS headphone 2 is arranged on the wired headset 1, the voice decoding chip 11 establishes a signal communication connection (corresponding to UART-1 interface in FIG. 2, and controlling audio transmission connection (corresponding to MIC-1 and SPK-1 interfaces in FIG. 2) or controlling the wired headset 1 to charge the TWS headphone 2 in practice, which is described in detail in the following embodiment) with the Bluetooth® voice decoding chip 21 in the left earbud of the TWS headphone 2, and establishes a signal communication connection (corresponding to UART-2 interface in FIG. 2, and controlling audio transmission connection (corresponding to MIC-2 and SPK-2 interfaces in FIG. 2) or controlling the wired headset 1 to charge the TWS earbuds 2 in practice, which is described in detail in the following embodiment) with the Bluetooth® voice decoding chip 21 in the right earbud of the TWS headphone 2. When the composite event is triggered, the voice decoding chip 11 communicates with the Bluetooth® voice decoding chip 21 in the left earbud of the TWS headphone 2, so that the Bluetooth® voice decoding chip 21 in the left earbud of the TWS headphone 2 establishes an audio transmission connection with both the audio playing device 13 of a corresponding earpiece and the voice acquisition device 12, or an audio transmission connection with the audio playing device 13 of a corresponding earpiece. Further, when the composite event is triggered, the voice decoding chip 11 communicates with the Bluetooth® voice decoding chip 21 in the right earbud of the TWS headphone 2, so that the Bluetooth® voice decoding chip 21 in the right earbud of the TWS headphone 2 establishes an audio transmission connection with both the audio playing device 13 of a corresponding earpiece and the voice acquisition device 12, or an audio transmission connection with the audio playing device 13 of a corresponding earpiece. For example, the voice acquisition device 12 is arranged in a left earpiece of the wired headset 1. The Bluetooth® voice decoding chip 21 in the left earbud of the TWS headphone 2 establishes an audio transmission connection with the audio playing device 13 of the left earpiece and the voice acquisition device 12 in the wired headset 1. The Bluetooth® voice decoding chip 21 in the right earbud of the TWS headphone 2 establishes an audio transmission connection with the audio playing device 13 of the right earpiece in the wired headset 1. It should be noted that in the present disclosure, the left earbud of the TWS headphone 2 corresponds to the left earpiece of the wired headset 1, and the right earbud of the TWS headphone 2 corresponds to the right earpiece of the wired headset 1.

After the audio transmission connection is established, the voice acquisition device 12, when acquiring voice, directly transmits the analog voice to the Bluetooth® voice decoding chip 21 connected to the voice acquisition device 12. When receiving the voice, the Bluetooth® voice decoding chip 21 converts the voice from analog to digital and transmits the converted voice via Bluetooth® of the Bluetooth® voice decoding chip 21. When receiving the first audio via Bluetooth® of the Bluetooth® voice decoding chip 21, the Bluetooth® voice decoding chip 21 converts the first audio from digital to analog, and transmits the converted first audio to the audio playing device 13 of a corresponding earpiece for playing.

In a case that the TWS headphone 2 is not arranged on the wired headset 1, the TWS headphone 2 operates independently. Specifically, when receiving audio via Bluetooth® of the Bluetooth® voice decoding chip 21, the Bluetooth® voice decoding chip 21 converts the audio from digital to analog and plays the converted audio via an audio playing device 13 of the Bluetooth® voice decoding chip 21. When receiving voice acquired by a voice acquisition device 12 of TWS headphone 2, the Bluetooth® voice decoding chip 21 converts the voice from analog to digital and transmits the converted voice via Bluetooth® of the Bluetooth® voice decoding chip 21.

In a case that the TWS headphone 2 is not arranged on the wired headset 1, or in a case that the TWS headphone 2 is arranged on the wired headset 1 and no composite event is triggered, the wired headset 1 operates independently. Specifically, the wired headset 1 receives the second audio via the headset cable and the audio interface 14, converts the second audio from analog to digital (which is performed in a case that the audio interface 14 is an analog audio interface and is not performed in a case that the audio interface 14 is a digital audio interface), performs stereo sound effect processing on the second audio in digital, converts the second audio subjected to the stereo sound effect processing from digital to analog, and then plays the converted second audio via the audio playing devices 13 in the left and right earpieces of the wired headset 1. When acquiring voice via the voice acquisition device 12 of the wired headset 1, the wired headset 1 converts the voice from analog to digital (which is performed in a case that the audio interface 14 is a digital audio interface and is not performed in a case that the audio interface 14 is an analog audio interface), and transmits the converted voice via the audio interface 14 and the headset cable.

In addition, the stereo sound effect processing herein may adjust EQ (equalizer), surround stereo sound, 3D sound effect and the like, which are not limited in the present disclosure. In the embodiment, the audio playing device 13 may be but is not limited to a speaker, and the voice acquisition device 12 may be but is not limited to a MIC (microphone). In a preferred embodiment, the audio interface 14 includes at least one of a digital audio interface and an analog audio interface. The digital audio interface herein may be but is not limited to a USB audio interface 14, and the analog audio interface may be but is not limited to a 3.5 mm audio interface 14.

It can be seen that the composite headphone according to the embodiment has the advantages of portability, high-quality sound effect and low-delay, which can meet the user requirements for using effects in various scenarios, improve the user experience and reduce the cost. In addition, the wired headset, when operate independently, may perform stereo sound effect processing on the second audio transmitted from the audio interface 14, thereby further meeting the requirements for high-quality sound effect.

In a preferred embodiment, the composite headphone includes a wired headset 1 and a TWS headphone 2. The TWS headphone 2 is detachably arranged on the wired headset 1. The wired headset 1 includes a level contact 19, an analog audio interface 18, an audio playing device 13 and a voice acquisition device 12. The audio playing device 13 and the voice acquisition device 12 are connected to the analog audio interface 18. The TWS headphone 2 includes a Bluetooth® voice decoding chip 21, and a detection contact matched with the level contact 19. When the detection contact contacts with the level contact 19, a level at the detection contact changes.

The Bluetooth® voice decoding chip 21, when detecting that a level at the detection contact corresponding to the Bluetooth® voice decoding chip 21 changes, establishes an audio transmission connection with an audio playing device 13 of a corresponding earpiece and a voice acquisition device 12, or establish an audio transmission connection with an audio playing device 13 of a corresponding earpiece; converts voice acquired by a voice acquisition device 12 connected to the Bluetooth® voice decoding chip 21 from analog to digital and transmits the converted voice via Bluetooth®; and converts audio received via Bluetooth® from digital to analog and plays the converted audio via an audio playing device 13 connected to the Bluetooth® voice decoding chip 21.

Figure 3:
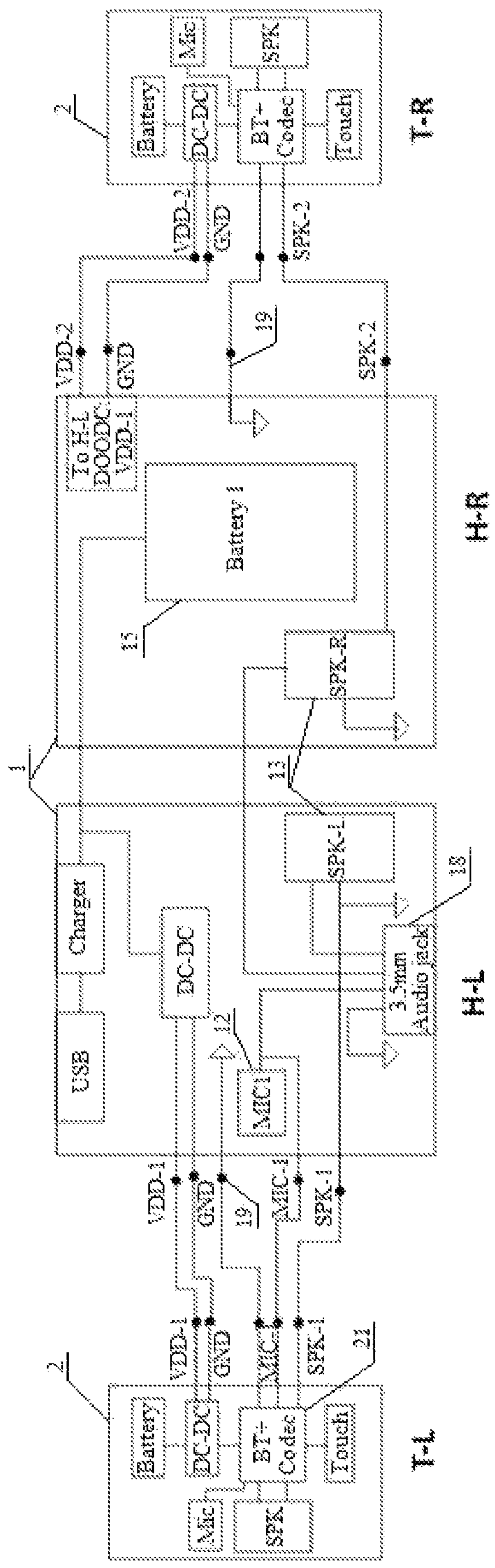
FIG. 3 is a schematic structural diagram showing a composite headphone in detail according to another embodiment of the present disclosure.

Reference is made to FIG. 3, which is a schematic structural diagram showing a composite headphone in detail according to the present disclosure.

A composite headphone is further provided according to another embodiment of the present disclosure. Compared with the embodiment described above, the level contact 19 in the present embodiment contacts with the detection contact to trigger the Bluetooth® voice decoding chip 21 to establish an audio transmission connection with an audio playing device 13 of a corresponding earpiece and a voice acquisition device 12, or establish an audio transmission connection with an audio playing device 13 of a corresponding earpiece. The level contact 19 outputs a predetermined level (that is, a high level or a low level). In a case that the level contact 19 is a high level contact 19, the level contact 19 is connected to a power supply (acquired through conversion of a battery 16 in the wired headset 1) in the wired headset 1. In a case that the level contact 19 is a low level contact 19, the level contact 19 is grounded. When the level contact 19 contacts with the detection contact in the TWS headphone 2, a level of the detection contact changes to the same level as an output level of the level contact 19. For example, if the level of the detection contact is originally a low level (specifically, the detection contact is grounded via a pull-down resistance), the level of the detection contact changes to the high level when the level contact 19 (outputting a high level) contacts with the detection contact. For another example, if the level of the detection contact is originally a high level (specifically, the detection contact is connected to a power supply via a pull-up resistance), the level of the detection contact changes to the low level when the level contact 19 (outputting a low level) contacts the detection contact. In addition, the wired headset 1 includes no voice decoding chip 11, so that the wired headset 1 has a simple structure, thereby reducing cost of the composite headphone.

The TWS headphone 2 and the wired headset 1 operate as follows.

1) The TWS headphone 2 is separate from the wired headset 1.

In this case, the TWS headphone 2 operates independently. Specifically, when receiving audio via Bluetooth® of the Bluetooth® voice decoding chip 21, the Bluetooth® voice decoding chip 21 converts the audio from digital to analog and plays the converted audio via an audio playing device of the Bluetooth® voice decoding chip 21. When receiving voice acquired by a voice acquisition device of the Bluetooth® voice decoding chip 21, the Bluetooth® voice decoding chip 21 converts the converted voice from analog to digital and transmits the voice via Bluetooth® of the Bluetooth® voice decoding chip 21.

In this case, the wired headset 1 operates independently. Specifically, the audio playing device 13 receives an analog audio via a headset cable and an analog audio interface 18, and plays the analog audio. When acquiring voice, a voice acquisition device 12 directly transmits the voice via an audio interface 14 and the headset cable.

It can be seen that in this case, the TWS headphone 2 and the wired headset 1 is independent of each other. The TWS headphone 2 serves as a wireless headphone based on Bluetooth®, to meet the user requirements for portability. An acoustic cavity and a sound playing device (such as a speaker) of the wired headset 1 are commonly large, thereby meeting the user requirements for high-quality sound effect. In addition, the wired headset 1 transmits audio and voice via the headset cable, which can further meet user requirements for low-delay.

2) The TWS headphone 2 is arranged on the wired headset 1.

The detection contact of the Bluetooth® voice decoding chip 21 contacts with the level contact 19 and the level of the detection contact changes. The Bluetooth® voice decoding chip 21, when detecting that the level of the detection contact of the Bluetooth® voice decoding chip 21 changes, establishes an audio transmission connection with an audio playing device 13 of a corresponding earpiece and a voice acquisition device 12, or establishes an audio transmission connection with an audio playing device 13 of a corresponding earpiece. For example, the voice acquisition device 12 is arranged in a left earpiece of the wired headset 1. The Bluetooth® voice decoding chip 21 in the left earbud of the TWS headphone 2 establishes an audio transmission connection with the audio playing device 13 of the left earpiece and the voice acquisition device 12 in the wired headset 1. The Bluetooth® voice decoding chip 21 in the right earbud of the TWS headphone 2 establishes an audio transmission connection with the audio playing device 13 of the right earpiece in the wired headset 1. It should be noted that in the present disclosure, the left earbud of the TWS headphone 2 corresponds to the left earpiece of the wired headset 1, and the right earbud of the TWS headphone 2 corresponds to the right earpiece of the wired headset 1.

After the audio transmission connection is established, the voice acquisition device 12, when acquiring voice, directly transmits analog voice to a Bluetooth® voice decoding chip 21 connected to the voice acquisition device 12. When receiving the voice, the Bluetooth® voice decoding chip 21 converts the voice from analog to digital and transmits the converted voice via Bluetooth® of the Bluetooth® voice decoding chip 21. When receiving first audio via Bluetooth® of the Bluetooth® voice decoding chip 21, the Bluetooth® voice decoding chip 21 converts the first audio from digital to analog, and transmits the converted first audio to an audio playing device 13 of a corresponding earpiece for playing.

In a preferred embodiment, the wired headset 1 further includes a button connected to the voice decoding chip 11. A composite event is trigged includes when a composite command transmitted via the button is received.

Specifically, in practice, when the TWS headphone 2 is required to cooperate with the wired headset 1, the TWS headphone 2 is first arranged on the wired headset 1. In this case, a signal communication connection is established between the wired headset 1 and the TWS headphone 2. A user transmits the composite command to the voice decoding chip 11 via the button to trigger the composite event, which is relatively simple.

In addition, the button herein may be additionally arranged on the wired headset 1 to achieve this function, or may be an existing button on the wired headset 1. In a case that the button is an existing button on the wired headset 1, a function trigger action (for example, the button being pressed three times) according to the embodiment is different from an original function trigger action (for example, the button being pressed one time) of the button. In this case, the cost of the composite headphone is further reduced and a volume of the wired headset 1 is reduced while achieving the function according to the embodiment.

A composite event may further be trigged in other ways, for example, when detecting that the wired headset 1 performs a predetermined action (for, example, shaking), which is not limited in the present disclosure.

In a preferred embodiment, when the composite event is triggered, the Bluetooth® voice decoding chip 21 further disconnects from the audio playing device and the voice acquisition device of the TWS headphone 2, and the voice decoding chip 11 disconnects from the voice acquisition device 12 and the audio interface 14.

When the composite event is triggered, the user requires the TWS headphone 2 to cooperate with the wired headset 1. That is, the user requires to play audio via the wired headset 1 and acquire voice via the voice acquisition device 12 of the wired headset 1. In this case, the TWS headphone 2 may play the audio and transmit the voice. Since the TWS headphone 2 arranged in the wired headset 1 is commonly far away from the mouth and ears of the user, it is considered that the TWS headphone 2 hardly acquire voice from the user and audio played by the TWS headphone 2 is hardly heard by the user, resulting in little impact on use of the wired headset 1 by the user. However, in this case, a load (resulted from its own operation and the Bluetooth® transfer service for the wired headset 1) as well as power consumption of the TWS earbud 2 are increased.

In view of the above technical problems, in this embodiment, when the composite event is triggered, the Bluetooth® decoding chip disconnects from the audio playing device and the voice acquisition device of the TWS headphone 2, and establishes an audio transmission connection with an audio playing device 13 of a corresponding earpiece and a voice acquisition device 12 or establishes an audio transmission connection with an audio playing device 13 of a corresponding earpiece. The voice decoding chip 11 also disconnects from the voice acquisition device 12 and the audio interface 14. That is, a wired mode of the wired headset 1 is inactive. It can be seen that in this way, the impact on the wired headset 1 can be avoided, the load and the power consumption of the TWS headphone 2 can be reduced.

In addition, the disconnection herein may be implemented by software or hardware.

In a preferred embodiment, the Bluetooth® voice decoding chip 21 disconnects from the audio playing device and the voice acquisition device 12 of the TWS earbud 2 as follows. First audio received via Bluetooth® is converted from digital to analog and then not played via the audio playing device of the TWS headset 2. Voice collected by the voice acquisition device of the TWS headset 2 is not processed.

In the embodiment, the Bluetooth® voice decoding chip 21 disconnects from the audio playing device and the voice acquisition device in the TWS headphone 2 by software. When receiving first audio, the Bluetooth® voice decoding chip 21 transmits the first audio to an audio playing device 13 connected with the Bluetooth® voice decoding chip 21 in the wired headset 1 rather than to the audio playing device in the TWS headphone 2. In addition, the Bluetooth® voice decoding chip 21 performs no processing on voice acquired by the voice acquisition device of the TWS headphone 2. By means of software, no additional device is arranged in the TWS headphone 2, thereby reducing the cost and the volume of the TWS headphone 2.

Alternatively, the Bluetooth® voice decoding chip 21 disconnects from the audio playing device and the voice acquisition device in the TWS headphone 2 by hardware. For example, a first switch is arranged between the Bluetooth® voice decoding chip 21 and the audio playing device of the TWS headphone 2, and a second switch is arranged between the Bluetooth® voice decoding chip 21 and the voice acquisition device of the TWS headphone 2. Therefore, the Bluetooth® voice decoding chip 21 disconnects from the audio playing device in the TWS headphone 2 by turning off the first switch and disconnects from the voice acquisition device in the TWS headphone 2 by turning off the second switch.

In a preferred embodiment, the voice decoding chip 11 disconnects from the voice acquisition device 12 and the audio interface 14 as follows. The voice decoding chip 11 performs no processing on voice acquired by the voice acquisition device 12 and second audio transmitted via the audio interface 14.

The voice decoding chip 11 disconnects from the voice acquisition device 12 and the audio interface 14 by software. Specifically, the voice decoding chip 11 performs no processing on second audio received via the audio interface 14, and performs no processing on voice received from the voice acquisition device 12. By means of software, no additional device is arranged in the wired headset 1, thereby further reducing the cost of the composite headphone, and reducing the volume of the wired headset 1.

Alternatively, a third switch is arranged between the voice decoding chip 11 and the audio interface 14, and a fourth switch is arranged between the voice decoding chip 11 and the voice acquisition device 12. Therefore, the voice decoding chip 11 disconnects from the audio interface 14 by turning off the third switch and disconnects from the voice acquisition device 12 by turning off the fourth switch.

How the disconnection is performed is not limited in the present disclosure, but depends on actual situations.

In a preferred embodiment, the wired headset 1 further includes a detection device 15. The detection device 15 is connected to the voice decoding chip 11.

Before the Bluetooth® voice decoding chip 21 establishes a communication connection with the audio playing device 13 of a corresponding ear and the voice acquisition device 12, the voice decoding chip 11 is further configured to establish a signal communication connection with the Bluetooth® voice decoding chip 21 when the detection device 15 detects that the TWS headphone 2 is arranged on the wired headset 1.

As described above, when the TWS headphone 2 is arranged on the wired headset 1, the TWS earbud 2 establishes a signal communication connection with the wired headset 1, to determine whether the TWS headphone 2 is arranged on the wired headset 1. In the embodiment, the wired headset 1 is further provided with the detection device 15 connected to the voice decoding chip 11. The detection device 15 detects whether the TWS headphone 2 is arranged on the wired headset 1. When determining that the TWS headphone 2 is arranged on the wired headset 1 based on detection data of the detection device 15, the voice decoding chip 11 establishes a signal communication connection with the Bluetooth® voice decoding chip 21. In this way, whether the TWS headphone 2 is arranged on the wired headset 1 can be automatically detected without operation by the user, achieving high automation.

The detection device 15 herein includes a Hall sensor and an induction magnet. The Hall sensor is arranged on the wired headset 1 (including a left earpiece and a right earpiece). The induction magnet is arranged on the TWS headphone 2 (including a left earbud and a right earbud) and matches with the Hall sensor.

Specifically, in the embodiment, the detection device 15 includes the Hall sensor and the induction magnet. When the TWS headphone 2 is close to the wired headset 1, the Hall sensor generates a Hall voltage when sensing a magnetic field generated by the induction magnet. A magnitude of the Hall voltage is related to a distance between the Hall sensor and the induction magnet, that is, a distance between the TWS headphone 2 and the wired headset 1. A small distance between the TWS headphone 2 and the wired headset indicates a large Hall voltage. The detection device 15 including the Hall sensor and the induction magnet has a simple structure and high detection accuracy.

Alternatively, the detection device 15 herein may further be other types of detection devices, such as an infrared sensor, which is not limited in the present disclosure.

In a preferred embodiment, the wired headset 1 is provided with a magnet. The TWS headphone 2 is provided with an iron sheet matched with the magnet. Alternatively, the headphone 2 is provided with a magnetic attraction member that is magnetically opposite to the magnet.

Specifically, the TWS headphone 2 is detachably arranged on the wired headset 1. Commonly, the wired headset 1 is provided with a groove so as to arrange the TWS headphone

2. Although the TWS headphone 2 is stuck in the groove, the TWS headphone 2 may fall out of the wired headset 1 when the wired headset 1 moves, resulting in low reliability.

In the embodiment, the magnet has attraction. Further, the wired headset 1 is large in volume and the TWS headphone 2 is small in volume. Therefore, the wired headset 1 is provided with the magnet, and the TWS headphone 2 is provided with the iron sheet that is small and matches with the magnet. The TWS headphone 2 is fixed on the wired headset 1 by sticking the iron sheet on the magnet, so that the TWS headphone 2 is stably and reliably arranged on the wired headset 1. In another embodiment, the TWS headphone 2 is provided with the magnetic attraction member magnetically opposite to the magnet, so that the TWS headphone 2 is fixed on the wired headset 1 by attraction between the magnet and the magnetic attraction member.

Further, the TWS headphone 2 may be fixed on the wired headset 1 in other manners, for example, the wired headset 1 is provided with a buckle for fixing the TWS headphone 2, which are not limited in the present disclosure.

In a preferred embodiment, the wired headset 1 further includes a battery 16 and a power management chip 17. The power management chip 17 is connected to the battery 16.

The voice decoding chip 11 is further configured to control, when the TWS headphone 2 is arranged on the wired headset 1, the battery 16 to charge the TWS headphone 2 via the power management chip 17.

Since the wired headset 1 is large in volume and the battery 16 in the wired headset 1 commonly has a large volume, so that power capacity of the battery 16 is large and therefore lasts relatively long. However, a battery 16 in the TWS headphone 2 has a small volume, and power capacity of the battery 16 is small and therefore lasts relatively short. Therefore, the battery 16 in the TWS headphone 2 is required to be charged frequently. In this embodiment, in order to prevent the composite headphone from being inactive due to insufficient power of the TWS headphone 2, the voice decoding chip 11 controls the battery 16 to charge the TWS headphone 2 via the power management chip 17 when the TWS headphone 2 is arranged on the wired headset 1, so as to ensure normal operation of the composite headphone and improve the reliability of the composite headphone. In addition, the power management chip 17 has various functions, such as controlling a charging current and a charging voltage. The battery 16 herein may be a rechargeable battery, and the wired headset 1 may further include a USB charging interface and a charging conversion module. The charging conversion module is connected to the USB charging interface and the rechargeable battery. The rechargeable battery is charged via the USB charging interface and the charging conversion module.

In a preferred embodiment, before the battery 16 is controlled to charge the TWS headphone 2 via the power management chip 17, the Bluetooth® voice decoding chip 21 acquires power of the TWS headphone 2. The battery 16 is controlled to charge the TWS headphone 2 via the power management chip 17 when it is determined that the power of the TWS headphone 2 is less than a first threshold and power of the battery 16 is greater than a second threshold.

In a case that the power of the battery 16 in the wired headset 1 is low and the power of the battery 16 in the TWS headphone 2 is sufficient, the battery 16 does not charge the TWS headphone 2. Specifically, when establishing a signal communication connection with the Bluetooth® voice decoding chip 21, the voice decoding chip 11 acquires the power of the battery 16 in the TWS headphone 2. Before controlling the battery 16 to charge the TWS headphone 2 via the power management chip 17, the voice decoding chip 11 determines whether the power of the battery 16 in the wired headset 1 is greater than the second threshold, and determines whether the power of the TWS headphone 2 is less than the first threshold. Only when the power of the TWS headphone 2 is less than the first threshold and the power of the battery 16 is greater than the second threshold, the voice decoding chip 11 controls the battery 16 to charge the TWS headphone 2 via the power management chip 17. It can be seen that in this way, a case that the wired headset 1 charges the TWS headphone 2 when the power of the TWS headphone 2 is sufficient and the power of the wired headset 1 is insufficient can be avoided, thereby slowing consumption of power of the battery 16 in the wired headset 1, and improving the reliability of the composite headphone.

In addition, consumption of power by a master earphone of the TWS headphone 2 may be different from consumption of power by a slave earphone of the TWS headphone 2. Therefore, power of the master earphone of the TWS headphone 2 is compared with the first threshold and power of the slave earphone of the TWS headphone 2 is compared with the first threshold, so that only an earphone whose power is lower than the first threshold is charged. Even if the power of only one of master and slave earphones of the TWS headphone 2 is lower than the first threshold, both the master and slave earphones may be charged. Under control of the power management chip 17, one of the master and slave earphones whose power is relatively low is supplied with a large current and the other of the master and slave earphones whose power is relatively large is supplied with a small current. How the master and slave earphones of the TWS headphone 2 are charged is not limited in the present disclosure but depends on actual situations.

It should be noted that the relationship terminologies in the specification such as first and second are only used herein to distinguish one entity or operation from another, rather than to necessitate or imply that the actual relationship or order exists between the entities or operations. Furthermore, terms of "include", "comprise" or any other variants thereof are intended to be non-exclusive. Therefore, a process, method, article or device including a series of elements includes not only the elements but also other elements that are not enumerated, or also includes an element inherent for the process, method, article or device. Unless expressively limited otherwise, the statement "comprising (including) one . . . " does not exclude the case that other similar element may exist in the process, method, article or device.

Based on the above description of the disclosed embodiments, those skilled in the art can implement or carry out the present disclosure. It is apparent for those skilled in the art to make many modifications to these embodiments. The general principle defined herein is applicable to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A composite headphone, comprising: a wired headset and a wireless Bluetooth® headphone, wherein the wired headset is configured to: establish, when the wireless Bluetooth® headphone is arranged on the wired headset and a composite event is triggered, an audio transmission connection with the wireless Bluetooth® headphone; and play, when the wireless Bluetooth® headphone is arranged on the wired headset and the composite event is triggered, first audio, wherein the first audio is received by the wireless Bluetooth® headphone via Bluetooth®;

the wireless Bluetooth® headphone is configured to: detachably arranged on the wired headset; and transmit via Bluetooth®, when the wireless Bluetooth® headphone is arranged on the wired headset and the composite event is triggered, voice acquired by the wired headset;

the wired headset comprises a voice decoding chip, an audio playing device, a voice acquisition device and an audio interface, wherein the audio playing device, the voice acquisition device and the audio interface are connected to the voice decoding chip; and the wireless Bluetooth® headphone comprises a Bluetooth® voice decoding chip; wherein the voice decoding chip is configured to: control, when the wireless Bluetooth® headphone is arranged on the wired headset and the composite event is triggered, the Bluetooth® voice decoding chip to establish an audio transmission connection with an audio playing device of a corresponding earpiece and the voice acquisition device or establish an audio transmission connection with an audio playing device of a corresponding earpiece; and perform, when the wired headset operate independently, stereo sound effect processing on second audio transmitted via the audio interface;

the Bluetooth® voice decoding chip is configured to: convert voice acquired by a voice acquisition device connected to the Bluetooth® voice decoding chip from analog to digital, and transmit the converted voice via Bluetooth®; and convert the first audio received via Bluetooth® from digital to analog, and play the converted first audio via the audio playing device of the corresponding earpiece.

2. The composite headphone according to claim 1, wherein the wireless Bluetooth® headphone is a true wireless stereo (TWS) headphone.

3. The composite headphone according to claim 1, wherein the Bluetooth® voice decoding chip is further configured to disconnect, when the composite event is triggered, from an audio playing device and a voice acquisition device of the wireless Bluetooth® headphone; and the voice decoding chip is further configured to disconnect, when the composite event is triggered, from the voice acquisition device and the audio interface of the wired headset.

4. The composite headphone according to claim 3, wherein for disconnecting from the audio playing device and the voice acquisition device of the wireless Bluetooth® headphone, the Bluetooth® voice decoding chip is further configured to:

after converting the first audio received via Bluetooth® from digital to analog, not play the converted first audio via the audio playing device of the wireless Bluetooth® headphone; and perform no processing on voice acquired by the voice acquisition device of the wireless Bluetooth® headphone.

5. The composite headphone according to claim 1, wherein the wired headset further comprises a button connected to the voice decoding chip; and wherein the composite event is triggered when a composite command transmitted by the button is received.

6. The composite headphone according to claim 1, wherein the wired headset further comprises a detection device connected to the voice decoding chip, wherein the voice decoding chip is further configured to establish, before controlling the Bluetooth® voice decoding chip to establish an audio transmission connection with the audio playing device of the corresponding earpiece and the voice acquisition device, a signal communication connection with the Bluetooth® voice decoding chip when the detection device detects that the wireless Bluetooth® headphone is arranged on the wired headset.

7. The composite headphone according to claim 1, wherein the wired headset is provided with a magnet; and the wireless Bluetooth® headphone is provided with an iron sheet matched with the magnet; or the wireless Bluetooth® headphone is provided with a magnetic attraction member magnetically opposite to the magnet.

8. The composite headphone according to claim 1, wherein the audio interface comprises at least one of a digital audio interface and an analog audio interface.

9. The composite headphone according to claim 1, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

10. The composite headphone according to claim 9, wherein the voice decoding chip is further configured to acquire, before controlling the battery to charge the wireless Bluetooth® headphone via the power management chip, power of the wireless Bluetooth® headphone, wherein the voice decoding chip is configured to control, when it is determined that the power of the wireless Bluetooth® headphone is less than a first threshold and power of the battery is greater than a second threshold, the battery to charge the wireless Bluetooth® headphone via the power management chip.

11. The composite headphone according to claim 3, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

12. The composite headphone according to claim 4, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

13. The composite headphone according to claim 5, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

14. The composite headphone according to claim 6, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

15. The composite headphone according to claim 7, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

16. The composite headphone according to claim 8, wherein the wired headset further comprises a battery, and a power management chip connected to the battery; and wherein the voice decoding chip is further configured to control, when the wireless Bluetooth® headphone is arranged on the wired headset, the battery to charge the wireless Bluetooth® headphone via the power management chip.

* * * * *